(12) United States Patent
Adams et al.

(10) Patent No.: US 9,262,499 B2
(45) Date of Patent: Feb. 16, 2016

(54) CONTEXT-BASED GRAPHICAL DATABASE

(75) Inventors: Samuel S. Adams, Rutherfordton, NC (US); Robert R. Friedlander, Southbury, CT (US); John K. Gerken, III, Apex, NC (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 13/569,366

(22) Filed: Aug. 8, 2012

(65) Prior Publication Data

US 2014/0046981 A1 Feb. 13, 2014

(51) Int. Cl.
G06F 7/00 (2006.01)
G06F 17/30 (2006.01)

(52) U.S. Cl.
CPC ................ *G06F 17/30587* (2013.01)

(58) Field of Classification Search
CPC ... G06F 17/30587; G06F 19/30; G06F 19/32; G06F 19/321
USPC .......................... 707/798, 800, 805, 999.102
See application file for complete search history.

(56) References Cited

U.S. PATENT DOCUMENTS

| | | | |
|---|---|---|---|
| 5,450,535 A | 9/1995 | North | |
| 5,664,179 A | 9/1997 | Tucker | |
| 5,689,620 A | 11/1997 | Kopec et al. | |
| 5,701,460 A | 12/1997 | Kaplan et al. | |
| 5,943,663 A | 8/1999 | Mouradian | |
| 5,974,427 A | 10/1999 | Reiter | |
| 6,199,064 B1 | 3/2001 | Schindler | |
| 6,275,833 B1 | 8/2001 | Nakamura et al. | |
| 6,314,555 B1 | 11/2001 | Ndumu et al. | |
| 6,334,156 B1 | 12/2001 | Matsuoka et al. | |
| 6,381,611 B1* | 4/2002 | Roberge et al. | 707/797 |
| 6,405,162 B1 | 6/2002 | Segond et al. | |
| 6,424,969 B1 | 7/2002 | Gruenwald | |
| 6,553,371 B2 | 4/2003 | Gutierrez-Rivas et al. | |
| 6,633,868 B1 | 10/2003 | Min et al. | |
| 6,735,593 B1* | 5/2004 | Williams | |
| 6,768,986 B2 | 7/2004 | Cras et al. | |
| 6,925,470 B1* | 8/2005 | Sangudi et al. | |

(Continued)

FOREIGN PATENT DOCUMENTS

| | | |
|---|---|---|
| EP | 1566752 A2 | 8/2005 |
| EP | 1843259 A2 | 10/2007 |

(Continued)

OTHER PUBLICATIONS

U.S. Appl. No. 13/342,406—Non-Final Office Action Mailed Sep. 27, 2013.

(Continued)

*Primary Examiner* — Mohammed R Uddin
(74) *Attorney, Agent, or Firm* — John R. Pivnichny; Law Office of Jim Boice (57) ABSTRACT

A context-based graphical database system for storing a data structure comprises an entity node that stores an identifier of an entity. A data node stores non-contextual entity data about the entity. At least one context node is linked to the data node. The at least one context node provides context to the non-contextual entity data in the data node to create contextual entity data. A pointer from the entity node to the data node returns a data node identifier to the entity node to link the contextual entity data to the entity.

11 Claims, 7 Drawing Sheets

(56) References Cited

U.S. PATENT DOCUMENTS

| | | |
|---|---|---|
| 6,990,480 B1 | 1/2006 | Burt |
| 7,058,628 B1 | 6/2006 | Page |
| 7,103,836 B1 | 9/2006 | Nakamura et al. |
| 7,209,923 B1 | 4/2007 | Cooper |
| 7,337,174 B1 | 2/2008 | Craig |
| 7,441,264 B2 | 10/2008 | Himmel et al. |
| 7,493,253 B1* | 2/2009 | Ceusters et al. ............ 704/9 |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2* | 11/2011 | Larson et al. ............ 707/802 |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,799,323 B2* | 8/2014 | Nevin, III ............ 707/797 |
| 8,849,907 B1 | 9/2014 | Hession et al. |
| 2002/0091677 A1* | 7/2002 | Sridhar ............ 707/2 |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1* | 8/2003 | Worden ............ 715/513 |
| 2003/0212851 A1 | 11/2003 | Drescher et al. |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1* | 8/2005 | Benja-Athon ............ 434/367 |
| 2005/0222890 A1 | 10/2005 | Cheng et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1* | 2/2007 | Bernstein et al. ............ 707/100 |
| 2007/0067343 A1* | 3/2007 | Mihaila et al. ............ 707/104.1 |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0185850 A1 | 8/2007 | Walters et al. |
| 2007/0239710 A1* | 10/2007 | Jing et al. ............ 707/6 |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0159317 A1* | 7/2008 | Iselborn et al. ............ 370/408 |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1* | 11/2008 | Larson et al. ............ 707/4 |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1* | 3/2009 | Natoli et al. ............ 370/351 |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0131293 A1 | 5/2010 | Linthicum et al. |
| 2010/0169137 A1* | 7/2010 | Jastrebski et al. ............ 705/7 |
| 2010/0169758 A1* | 7/2010 | Thomsen ............ 715/212 |
| 2010/0174692 A1* | 7/2010 | Meyer et al. ............ 707/696 |
| 2010/0179933 A1 | 7/2010 | Bai et al. |
| 2010/0191743 A1 | 7/2010 | Perronnin et al. |
| 2010/0191917 A1 | 7/2010 | Ji et al. |
| 2010/0241644 A1 | 9/2010 | Jackson et al. |
| 2010/0257198 A1 | 10/2010 | Cohen et al. |
| 2010/0268747 A1* | 10/2010 | Kern et al. ............ 707/803 |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1* | 4/2011 | Fuchs ............ 707/755 |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1* | 12/2011 | Chu et al. ............ 370/256 |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1* | 1/2012 | Nevin, III ............ 707/798 |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1* | 5/2012 | Anisimovich et al. ............ 704/9 |
| 2012/0110004 A1 | 5/2012 | Meijer |
| 2012/0110016 A1* | 5/2012 | Phillips ............ 707/780 |
| 2012/0131139 A1 | 5/2012 | Siripurapu et al. |

(56) References Cited

U.S. PATENT DOCUMENTS

| | | | |
|---|---|---|---|
| 2012/0131468 | A1 | 5/2012 | Friedlander et al. |
| 2012/0166373 | A1 | 6/2012 | Sweeney et al. |
| 2012/0191704 | A1 | 7/2012 | Jones |
| 2012/0209858 | A1 | 8/2012 | Lambda et al. |
| 2012/0221439 | A1 | 8/2012 | Sundaresan et al. |
| 2012/0233194 | A1 | 9/2012 | Ohyu et al. |
| 2012/0239761 | A1 | 9/2012 | Linner et al. |
| 2012/0240080 | A1 | 9/2012 | O'Malley |
| 2012/0246148 | A1 | 9/2012 | Dror |
| 2012/0259841 | A1 | 10/2012 | Hsiao et al. |
| 2012/0278897 | A1 | 11/2012 | Ang et al. |
| 2012/0281830 | A1 | 11/2012 | Stewart et al. |
| 2012/0290950 | A1 | 11/2012 | Rapaport et al. |
| 2012/0297278 | A1 | 11/2012 | Gattani et al. |
| 2012/0311587 | A1 | 12/2012 | Li et al. |
| 2012/0316821 | A1 | 12/2012 | Levermore et al. |
| 2012/0330958 | A1 | 12/2012 | Xu et al. |
| 2013/0019084 | A1 | 1/2013 | Orchard et al. |
| 2013/0031302 | A1 | 1/2013 | Byom et al. |
| 2013/0060696 | A1 | 3/2013 | Martin et al. |
| 2013/0103389 | A1 | 4/2013 | Gattani et al. |
| 2013/0124564 | A1 | 5/2013 | Oztekin et al. |
| 2013/0173585 | A1 | 7/2013 | Friedlander et al. |
| 2013/0191392 | A1 | 7/2013 | Kumar et al. |
| 2013/0238667 | A1 | 9/2013 | Carvalho et al. |
| 2013/0246562 | A1* | 9/2013 | Chong et al. ................. 709/217 |
| 2013/0291098 | A1 | 10/2013 | Chung et al. |
| 2013/0311473 | A1 | 11/2013 | Safovich et al. |
| 2013/0326412 | A1 | 12/2013 | Treiser |
| 2013/0339379 | A1 | 12/2013 | Ferrari et al. |
| 2014/0006411 | A1 | 1/2014 | Boldyrev et al. |
| 2014/0012884 | A1 | 1/2014 | Bornea et al. |
| 2014/0025702 | A1 | 1/2014 | Curtiss et al. |
| 2014/0059084 | A1 | 2/2014 | Adams et al. |
| 2014/0074886 | A1 | 3/2014 | Medelyan et al. |
| 2014/0214865 | A1 | 7/2014 | Adams et al. |
| 2014/0214871 | A1 | 7/2014 | Adams et al. |
| 2014/0250111 | A1 | 9/2014 | Morton et al. |
| 2014/0324915 | A1* | 10/2014 | Gkoulalas-Divanis et al. ............................ 707/803 |
| 2014/0344718 | A1 | 11/2014 | Rapaport et al. |

FOREIGN PATENT DOCUMENTS

| | | | |
|---|---|---|---|
| WO | 2006086179 | A2 | 8/2006 |
| WO | 2007044763 | A2 | 4/2007 |

OTHER PUBLICATIONS

U.S. Appl. No. 13/610,347—Non-Final Office Action Mailed Jul. 19, 2013.

U.S. Appl. No. 13/610,347—Notice of Allowance Mailed Aug. 19, 2013.

U.S. Appl. No. 13/755,623—Notice of Allowance Mailed May 27, 2014.

S. Alam et al., "Interoperability of Security-Enabled Internet of Things", Springer, Wireless Personal Communications, Dec. 2011, vol. 61, pp. 567-586.

U.S. Appl. No. 13/648,801—Non-Final Office Action Mailed Jul. 1, 2014.

U.S. Appl. No. 13/609,710—Final Office Action Mailed Jul. 24, 2014.

R. Angles et al., "Survey of Graph Database Models", ACM Computing Surveys, vol. 40, No. 1, Article 1, Feb. 2008, pp. 1-65.

U.S. Appl. No. 13/733,052—Non-Final Office Action mailed Sep. 18, 2014.

U.S. Appl. No. 13/861,058—Non-Final Office Action mailed Dec. 11, 2014.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/540,267—Non-Final Office Action Mailed Feb. 4, 2014.

U.S. Appl. No. 13/540,230—Non-Final Office Action Mailed Jan. 30, 2014.

U.S. Appl. No. 13/540,295—Non-Final Office Action Mailed Jan. 30, 2014.

U.S. Appl. No. 13/609,710—Non-Final Office Action Mailed Jan. 27, 2014.

U.S. Appl. No. 13/342,406—Notice of Allowance Mailed Mar. 20, 2014.

U.S. Appl. No. 13/628,853—Non-Final Office Action Mailed Nov. 7, 2013.

U.S. Appl. No. 13/593,905—Notice of Allowance Mailed Oct. 25, 2013.

U.S. Appl. No. 13/595,356—Non-Final Office Action Mailed Apr. 14, 2014.

M.J. Flynn, et al., "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.

P. Kanerva, "What We Mean When We Say "What's the Dollar of Mexico?"": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

U.S. Appl. No. 13/342,305, Friedlander et al.—Specification Filed Jan. 3, 2012.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

W. Caid et al., "Context Vector-Based Text Retrieval", Fair ISAAC Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer's Guide: Chapter 6—Mapping Object Model to Data Model and Vice Versa", 2007, pp. 6-2-6-26.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Avinash Kaushik, "End of Dumb Tables in Web Analytics Tools! Hello: Weighted Sort", Sep. 7, 2010, www.kaushik.net, pp. 1-15.

Evaggelio Pitoura et al., "Context in Databases", University of Ioannina, Greece, 2004, pp. 1-19.

U.S. Appl. No. 13/562,714, Robert R. Friedlander, et al.—Specification and Drawings Filed Jul. 31, 2012.

(56) References Cited

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

J. Cheng et al., "Context-Aware Object Connection Discovery in Large Graphs", Data Engineering, 2009. ICDE '09. IEEE 25th International Conference on, pp. 856-867.

U.S. Appl. No. 13/592,905—Non-Final Office Action Mailed May 8, 2013.

U.S. Appl. No. 13/755,987—Non-Final Office Action mailed Jan. 2, 2015.

U.S. Appl. No. 13/648,801—Final Office Action mailed Jan. 13, 2015.

G. Begelman et al., "Automated Tag Clustering: Improving Search and Exploration in the TagSpace", Collaborative Tagging Workshop, WWW2006, Edinburgh, Scotland, May 2006, pp. 1-29.

U.S. Appl. No. 13/621,931—Non-Final Office Action mailed Jan. 28, 2015.

U.S. Appl. No. 13/732,567—Non-Final Office Action mailed Jan. 30, 2015.

U.S. Appl. No. 14/078,135—Notice of Allowance mailed Feb. 24, 2015.

U.S. Appl. No. 13/756,051—Notice of Allowance mailed Feb. 27, 2015.

U.S. Appl. No. 13/732,567—Non-Final Office Action mailed Mar. 26, 2015.

L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).

S. Ceri et al., "Model-Driven Development of Context-Aware Web Applications", ACM, ACM Transactions on Internet Technology, 2007, (Abstract Only).

U.S. Appl. No. 13/610,523—Non-Final Office Action mailed Apr. 30, 2015.

U.S. Appl. No. 13/540,267—Non-Final Office Action mailed Jun. 4, 2015.

U.S. Appl. No. 13/609,710—Examiner's Answer mailed Jun. 9, 2015.

U.S. Appl. No. 13/780,779—Non-Final Office Action mailed Apr. 3, 2015.

U.S. Appl. No. 13/896,461—Non-Final Office Action mailed Apr. 21, 2015.

\* cited by examiner

CONTEXT-BASED GRAPHICAL DATABASE

BACKGROUND

The present disclosure relates to the field of computers, and specifically to the use of databases in computers. Still more particularly, the present disclosure relates to context-based graphical databases and their use.

A database is a collection of data. Various types of databases include relational databases, graph databases, network databases, and object-oriented databases. Each type of database presents data in a non-dynamic manner, in which the data is statically stored without contextual meaning.

SUMMARY

In one embodiment, a context-based graphical database system for storing a data structure comprises an entity node that stores an identifier of an entity. A data node stores non-contextual entity data about the entity. At least one context node is linked to the data node. The at least one context node provides context to the non-contextual entity data in the data node to create contextual entity data. A pointer from the entity node to the data node returns a data node identifier to the entity node to correlate the contextual entity data to the entity.

In one embodiment, a computer program product and/or computer system creates a context-based graphical database system. The computer program product comprises a computer readable storage medium. Stored on the computer readable storage medium are: first program instructions to establish an entity node, wherein the entity node stores an identifier of an entity; second program instructions to establish a data node, wherein the data node stores non-contextual entity data about the entity, wherein the non-contextual entity data is meaningless data, and wherein the meaningless data has no context to identify what the meaningless data describes; third program instructions to establish at least one context node linked to the data node, wherein said at least one context node provides context to the non-contextual entity data in the data node to create contextual entity data, and wherein the contextual entity data is meaningful data that contextually describes the entity; and fourth program instructions to establish a pointer from the entity node to the data node, wherein the pointer returns a data node identifier to the entity node to correlate the contextual entity data to the entity.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
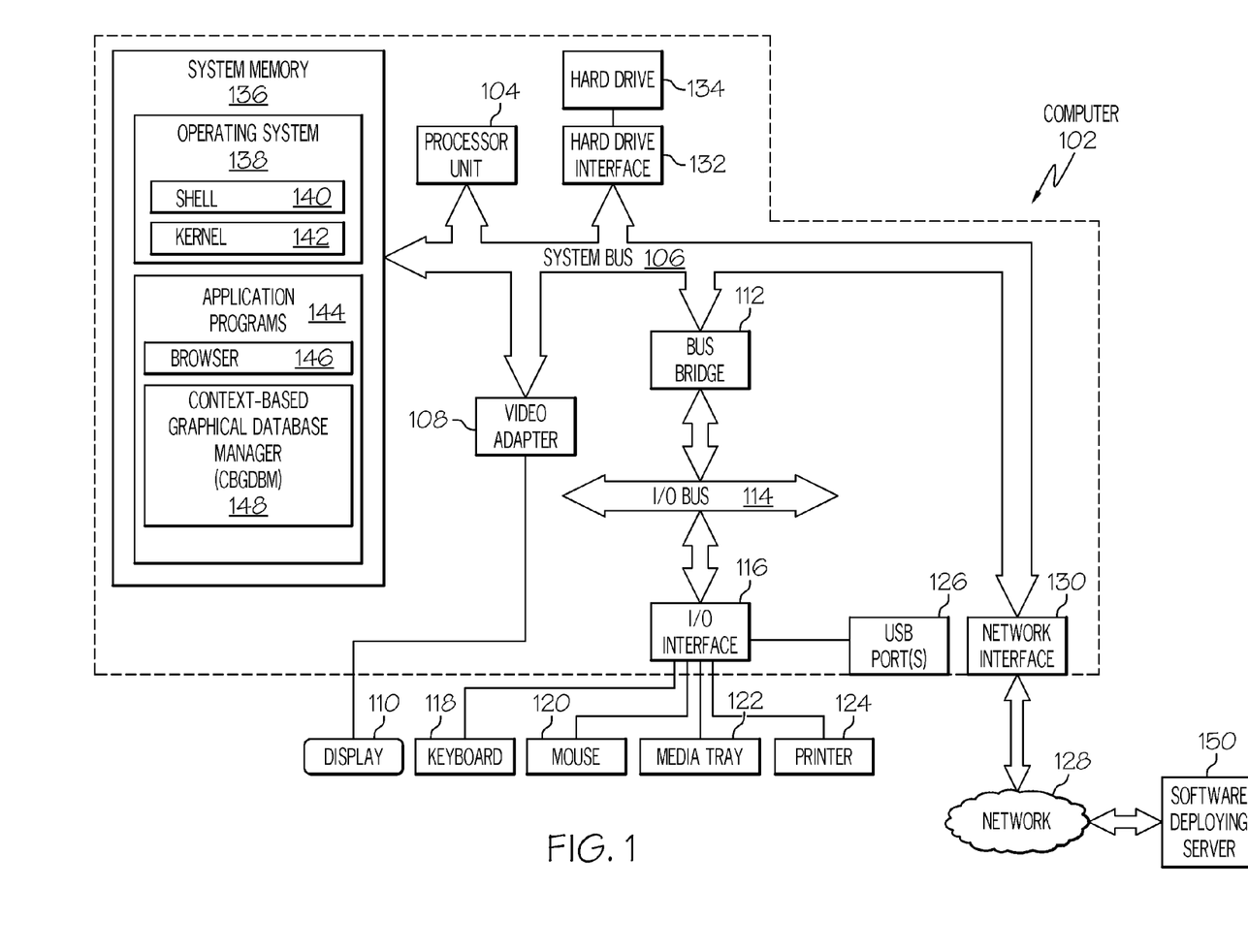
FIG. 1 depicts an exemplary system and network in which the present disclosure may be implemented.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a context-based graphical database manager (CBGDBM) 148. CBGDBM 148 includes code for implementing the processes described below, including those described in FIGS. 2-7. In one embodiment, computer 102 is able to download CBGDBM 148 from software deploying server 150, including in an on-demand basis, wherein the code in CBGDBM 148 is not downloaded until needed for execution. Note further that, in one embodiment of the present invention, software deploying server 150 performs all of the functions associated with the present invention (including execution of CBGDBM 148), thus freeing computer 102 from having to use its own internal computing resources to execute CBGDBM 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 3:
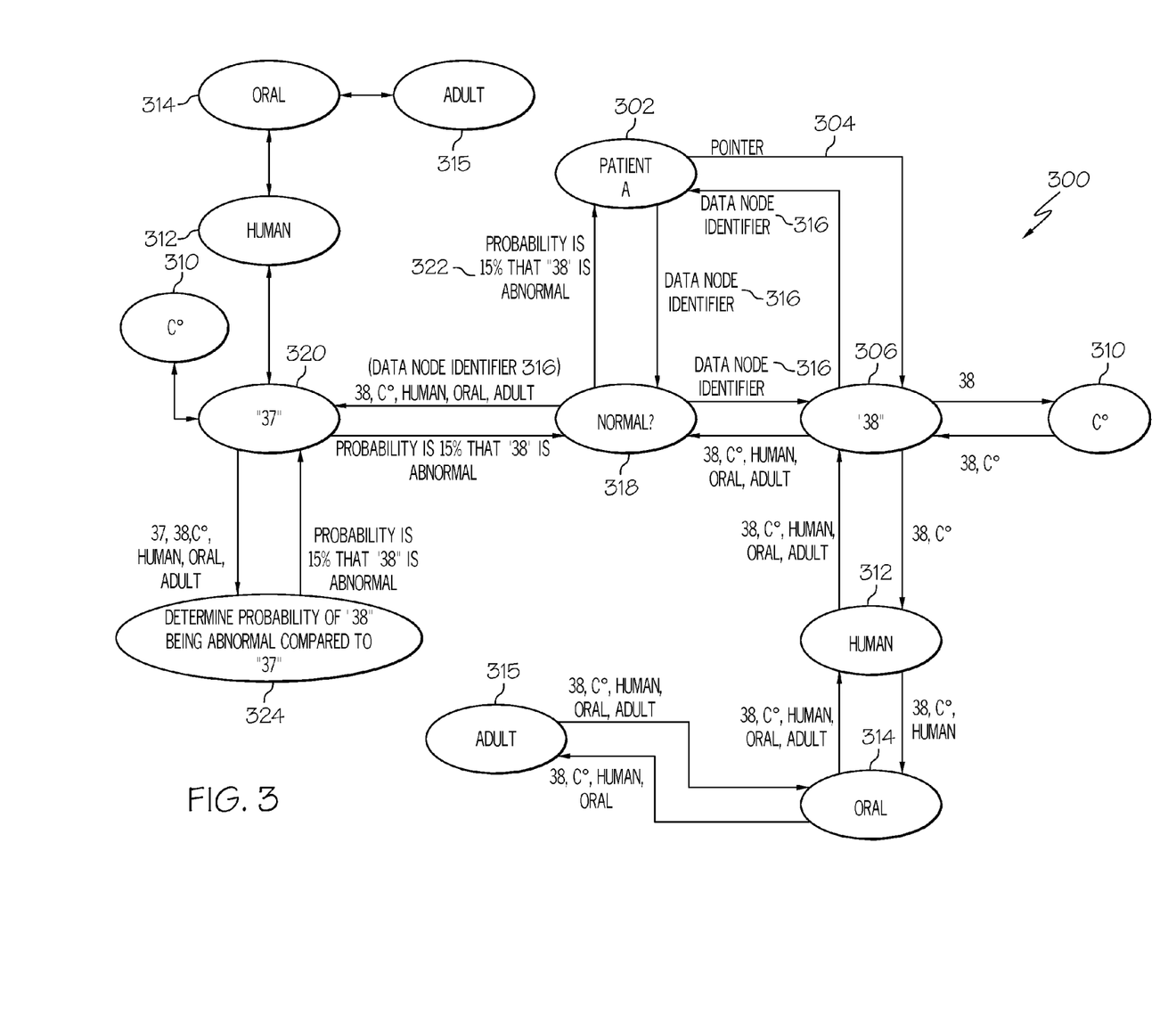
FIG. 3 depicts an exemplary medical use case of the context-based graphical database depicted in FIG. 2.
Figure 4:
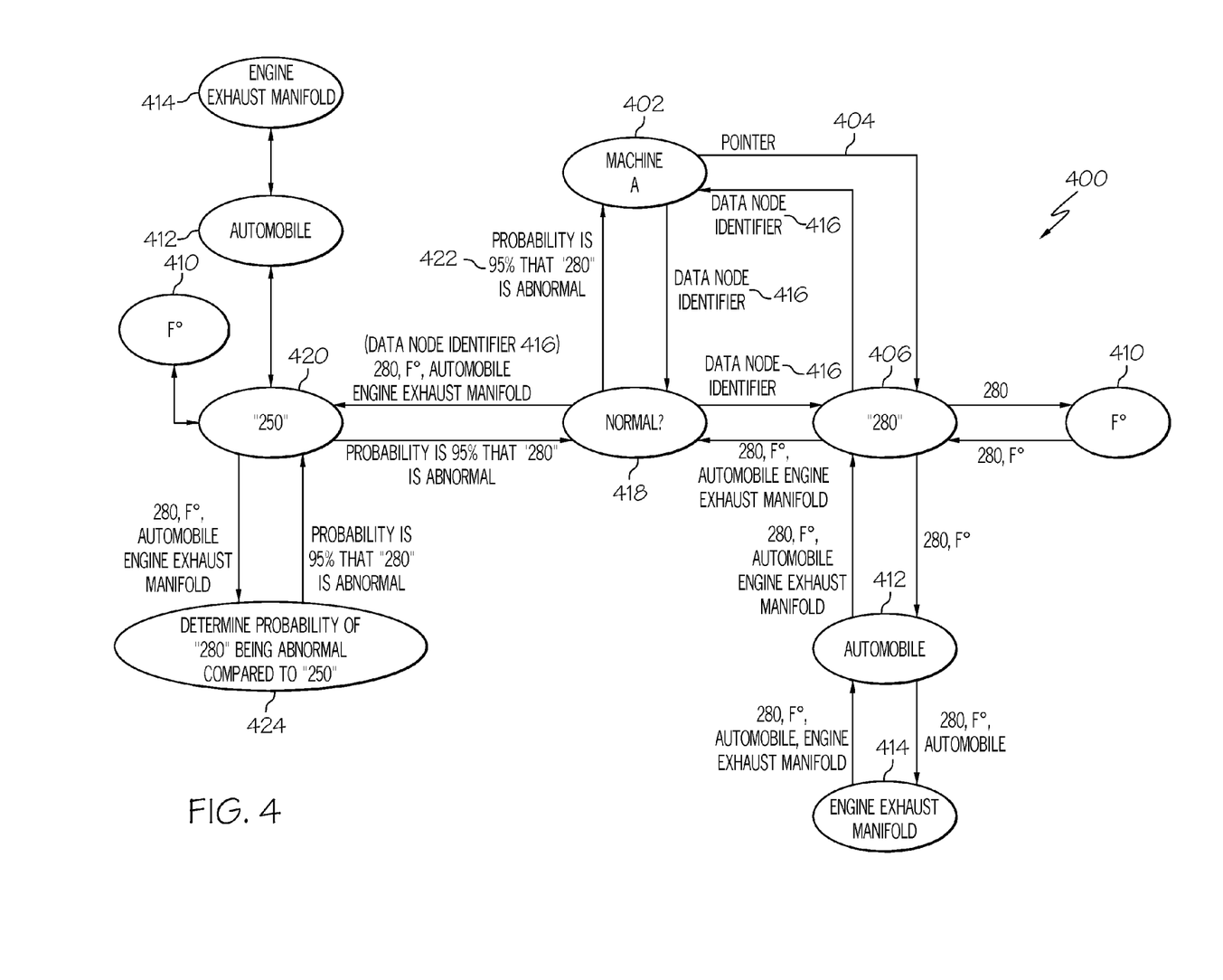
FIG. 4 depicts an exemplary automotive use case of the context-based graphical database depicted in FIG. 2.
Figure 5:
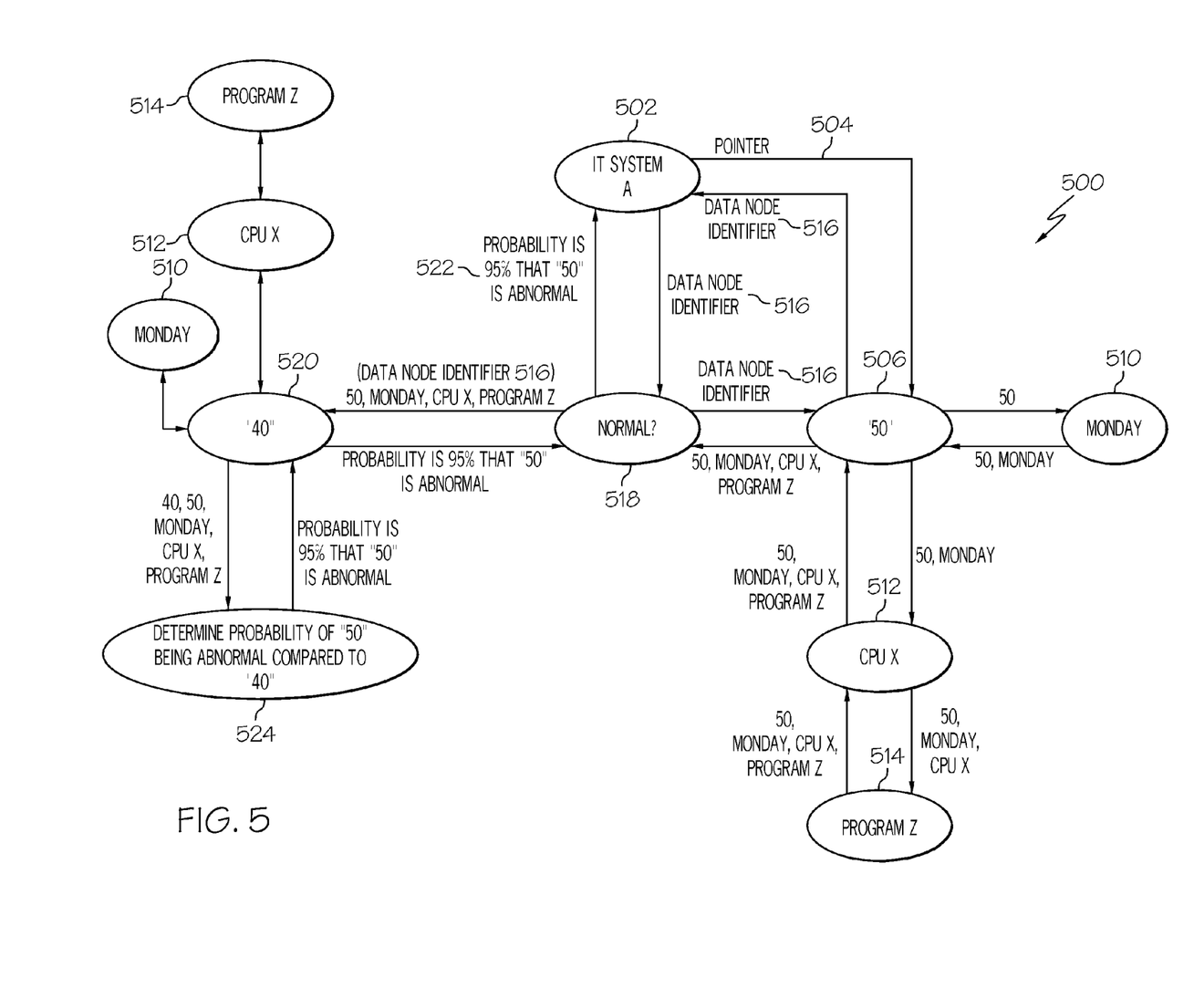
FIG. 5 depicts an exemplary information technology (IT) use case of the context-based graphical database depicted in FIG. 2.

Note that CBGDBM 148 is able to generate and/or utilize the context-based graphical databases depicted in FIGS. 3-5.

Note further that as used herein, the terms "data" and "datum" are used interchangeably to describe both singular and plural data.

Figure 2:
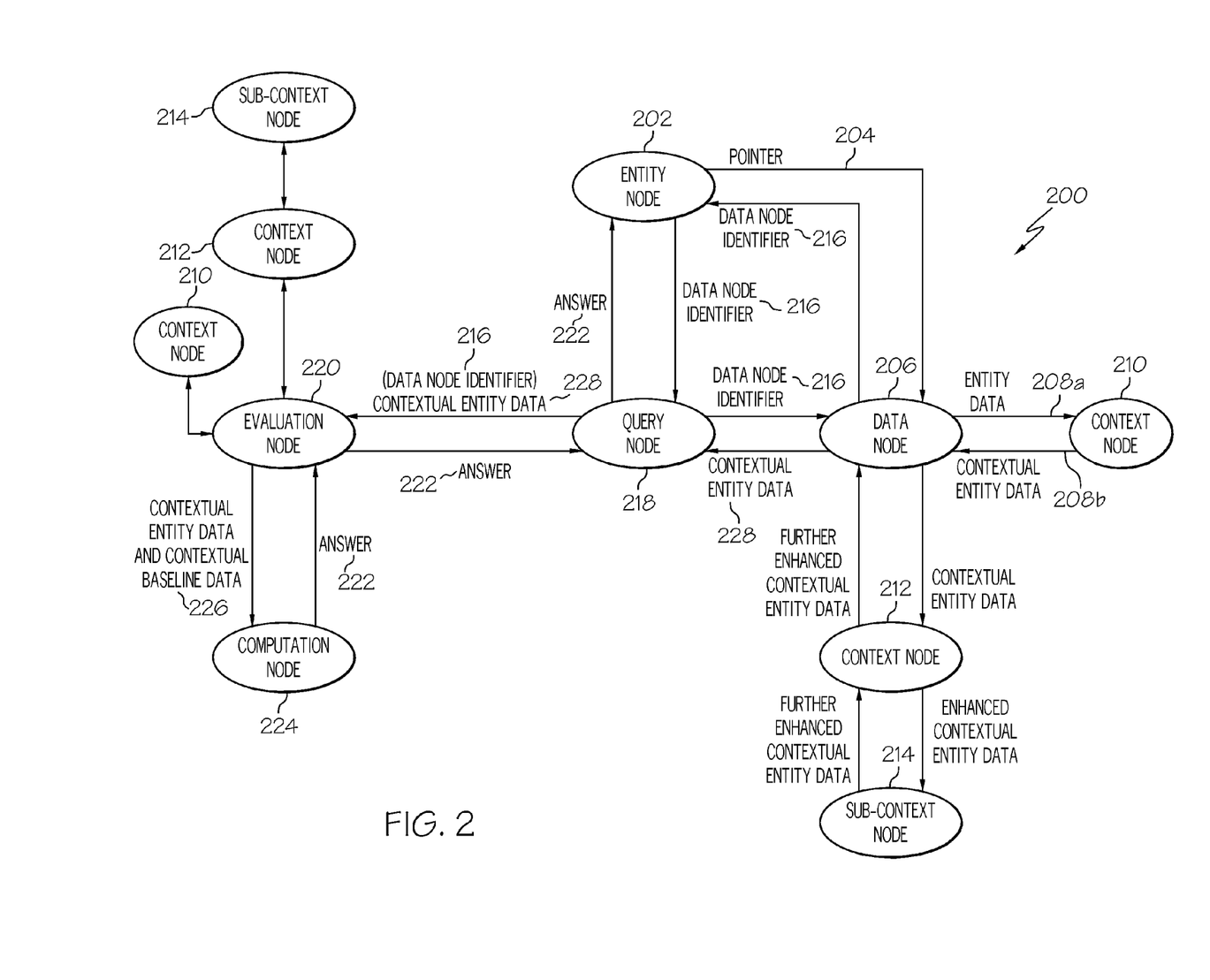
FIG. 2 illustrates a novel context-based graphical database.

With reference now to FIG. 2, a context-based graphical database 200 in accordance with one embodiment of the present invention is presented. An entity node 202 stores an identifier of an entity. This identifier may be a name, a unique identification number, a social security number, a lot number, etc. The entity may be a person, a machine, a pharmaceutical product, an information technology (IT) system, etc. A pointer 204 points to a data node 206. The data node 206 stores non-contextual (i.e., "meaningless") entity data about the entity identified by entity node 202. That is, this non-contextual entity data is data that describes some feature, attribute, characteristic, capability, location, etc. of that entity.

However, since the data has no context (i.e., it is merely a number, a set of characters, a word, etc.), then the data does not actually describe anything about that entity. In order for this "meaningless" entity data to be "meaningful" entity data, context must be provided. In accordance with the present invention, this context is provided by context and sub-context nodes. In one embodiment, context provided by the context nodes and sub-context nodes describes a circumstance or environment that applies to the non-contextual entity data stored in the data node 206.

Thus, in the exemplary context-based graphical database 200, context nodes are linked to the data node and/or each other via arcs, such as arcs 208a-b. An arc is defined as a link that exchanges information, which is stored in two nodes, between the two nodes. For example, arc 208a communicates entity data that is stored within the data node 206 to a context node 210. The context node 210 then returns contextual entity data, using context information that is stored in the context node 210, to the data node 206 via arc 208b. This contextual entity data is then forwarded from data node 206 to other nodes, as described herein.

In one embodiment, the contextual entity data from the context node 210 is forwarded from data node 206 to another context node 212. In one embodiment, context node 210 and context node 212 provide context that is unrelated to each other. That is, context node 210 provides context related to one feature/attribute/etc. of the entity data stored in data node 206, while context node 212 provides context related to a different feature/attribute/etc. of the entity data stored in data node 206.

In the example shown in FIG. 2, the context node adds additional context to the contextual entity data to create enhanced contextual entity data, which is forwarded to sub-context node 214. In this embodiment, the context in context node 212 and sub-context node 214 are related. That is, the context in sub-context node 214 provides additional information about the context stored in context node 212. The sub-context node 214 adds the sub-context stored within the sub-context node 214 to create further enhanced contextual entity data, which is returned to context node 212. The context node 212 then returns this further enhanced contextual entity data to the data node 206, where it is stored/cached.

The data node 206 returns a data node identifier 216 to the entity node 202, preferably after all context has been added to the data that was originally stored in the data node 206 for the entity identified by entity node 202. The entity node 202 then transmits this data node identifier 216 to a query node 218. The query node contains logic to execute (or preferably, to call in another node(s) such as evaluation node 220 and/or computation node 224, described below) an algorithm using incoming data and a known value as input parameters. In order to obtain the incoming value, the query node 218 uses the data node identifier 216 to retrieve the contextual entity data 228 (i.e., the "further enhanced contextual entity data" described above) from the data node 206. This contextual entity data 228 includes both the meaningless data (which was originally stored within the data node 206) as well as the context (provided by the context/sub-context nodes 210, 212, 214) for that meaningless data.

In one embodiment, the query node 218 is programmed to transmit the contextual entity data 228 to an evaluation node 220, which examines the contextual entity data 228 in order to provide an answer 222 to some pre-programmed evaluation algorithm within the evaluation node 220. If the evaluation requires a particular computation, then the contextual entity data 228 is sent to a computation node 224. Assume that, in one embodiment, the computation provided by computation node 224 is a probabilistic comparison, in which the contextual entity data 228 is compared to some contextual baseline data that has been predetermined by the evaluation node 220. In this embodiment, a probability distribution curve can be computed by the computation node 224 for contextual data such as that described by the context of contextual entity data 228. The computation node 224 then compares the contextual entity data 228 with contextual baseline data (both of which are found in contextual entity data and contextual baseline data 226) in order to determine the probability that the contextual entity data 228 is normal (e.g., is a nominal value for some descriptor of the entity) or abnormal (e.g., indicates a disease, malfunction, etc. in the entity). This probability is returned as the answer 222, which ultimately is returned to the entity node 202.

Note that in one embodiment, the contextual entity data 228 is not transmitted from the query node 218 to the evaluation node 220. Rather, in this embodiment the data node identifier 216 is sent from the query node 218 to the evaluation node 220. This data node identifier 216 enables the evaluation node 220 to retrieve the entity data from data node 206 as well as the context provided by context/sub-context nodes 210, 212, and 214. That is, the evaluation node 220 is able to retrieve the meaningless entity data from data node 206, and then apply the context (from context node 210, context node 212, and/or sub-context node 214) to the entity data in order to create the meaningful entity data used in the evaluation/computation that are respectively provided by the evaluation node 220 and/or the computation node 224.

Note that there are likely other context/sub-context nodes in the context-based graphical database 200 other than those shown in FIG. 2. However, these context/sub-context nodes are not considered, since there is no pointer from the entity node 202 to them. However, the system is dynamic. That is, context/sub-context nodes can be added/removed, thus, changing the context and meaning of entity data, as well as the query made by query node 218. For example, if the original context was for a first context, changing the first context to a second context allows the query node 218 to make a query that is substantively different, since the meaning of the entity has substantially changed. Thus, it is the context, as much as the original entity data, that determines what type of query will be made by the query node 218. In one embodiment, these combinations of contexts/sub-contexts are predetermined as a "synthetic context". A synthetic context is therefore defined as a set of contexts/sub-contexts that provide contextual meaning to a value, which may be an integer, symbol, word, etc., and which is meaningless without context.

With reference now to FIG. 3, an exemplary medical use case of the context-based graphical database depicted in FIG. 2 is presented as context-based graphical database 300. Entity node 302 stores an identifier for "Patient A", as well as a pointer 304 to data node 306, which stores the meaningless number "38". However, linked to data node 306 is context node 310 (which provides the context that this number is a temperature value on the Celsius scale), as well as context node 312 (which provides the context that this temperature has been taken from a human). Linked to the context node 312 is a sub-context node 314, which identifies the temperature as having been taken orally. A sub-context node 315, which is linked to the sub-context node 314, provides the additional context that this oral temperature was taken from an adult (i.e., "Patient A" is an adult). The context data from the context/sub-context nodes is then applied to the meaningless entity data ("38") originally stored in the data node 306, in order to create meaningful contextual entity data ("38, C.°, human, oral, adult").

As in FIG. 2, the data node 306 sends a data node identifier 316 to the entity node 302 after the meaningful contextual entity data ("38, C.°, human, oral, adult") is created. This data node identifier 316 is then sent to a query node 318, which is used to determine what the probability that an oral temperature of 38° C. is normal in an adult human. Stored within the evaluation node 320 is the value "37", against which the entity data "38" will be evaluated. Note that while 37° C. is often deemed "normal" in an adult human, an oral temperature of 38° C. may actually be normal as well, depending on ambient temperature (i.e., "room temperature" where the patient's temperature was taken), exertion level of the patient (i.e., it is normal for a patient's temperature to rise temporarily with intense exertion), etc. Thus, the query node 318 will send either the meaningful data (38, C.°, human, oral, adult) or the data node identifier 316 to the evaluation node 320. Note that if the data node identifier 316 is sent, the evaluation node 320 will obtain the context from the context nodes 310 and 312 and the sub-context nodes 314 and 315.

The evaluation node 320 then sends the meaningful context-based entity data (38, C.°, human, oral, adult) as well as the contextual baseline data (37, C.°, human, oral, adult) to computation node 324, which determines the probability of "38, C.°, human, oral, adult" being abnormal (i.e., is indicative of a disease, infection, or other medical condition in Patient A). This probability (e.g., 15%) is then returned to the entity node 302 via the evaluation node 320 and the query node 318.

With reference now to FIG. 4, an exemplary automotive use case of the context-based graphical database depicted in FIG. 2 is presented as context-based graphical database 400. Entity node 402 stores an identifier for "Machine A", as well as a pointer 404 to data node 406, which stores the meaningless number "280". However, linked to data node 406 is context node 410 (which provides the context that this number is a temperature value on the Fahrenheit scale), as well as context node 412 (which provides the context that this temperature has been taken from an automobile). Linked to the context node 412 is a sub-context node 414, which identifies the temperature as having been taken at the engine exhaust manifold of the automobile. The context/sub-context data is then applied to the meaningless entity data originally stored in the data node 406 ("280"), in order to create meaningful contextual entity data ("280, F.°, automobile, engine exhaust manifold").

As in FIG. 2, the data node 406 sends a data node identifier 416 to the entity node 402 after the meaningful contextual entity data ("280, F.°, automobile, engine exhaust manifold") is created. This data node identifier 416 is then sent to a query node 418, which is used to determine what the probability is that an engine exhaust manifold temperature of 280° F. is normal in an automobile. Stored within the evaluation node 420 is the value "250" (i.e., the maximum "normal" exhaust manifold temperature for automobile engines), against which the entity data "280" will be evaluated. Note that while 250° F. is often deemed as a maximum "normal" temperature for an exhaust manifold, a manifold temperature of 280° F. may actually be normal as well, depending on ambient temperature (i.e., air temperature in the desert), exertion level of the engine (i.e., it may be normal for a race car's engine to run hotter during a race than a normal passenger car), etc. Thus, the query node 418 will send either the meaningful data ("280, F.°, automobile, engine exhaust manifold") or the data node identifier 416 to the evaluation node 420. Note that if the data node identifier 416 is sent, the evaluation node 420 can obtain the context from the context nodes 410 and 412 and the sub-context node 414.

The evaluation node 420 then sends the meaningful context-based entity data ("280, F.°, automobile, engine exhaust manifold") as well as the contextual baseline data ("250, F.°, automobile, engine exhaust manifold") to computation node 424, which determines the probability of "280, F.°, automobile, engine exhaust manifold" being abnormal (i.e., is indicative of a malfunction in the cooling system of the automobile's engine, a faulty bearing in the engine, etc.). This probability (e.g., 95%) is then returned to the entity node 402 via the evaluation node 420 and the query node 418.

With reference now to FIG. 5, an exemplary information technology (IT) system use case of the context-based graphical database depicted in FIG. 2 is presented as context-based graphical database 500. Entity node 502 stores an identifier for "IT system A", as well as a pointer 504 to data node 506, which stores the meaningless number "50". However, linked to data node 506 is context node 510 (which provides the context that this number was generated on a Monday), as well as context node 512 (which provides the context that the number was output by CPU X). Linked to the context node 512 is a sub-context node 514, which identifies the output of "50" from CPU X being the result of the execution of software Program Z. The context/sub-context data is then applied to the meaningless entity data originally stored in the data node 506 ("50"), in order to create meaningful contextual entity data ("50, Monday, CPU X, Program Z").

As in FIG. 2, the data node 506 sends a data node identifier 516 to the entity node 502 after the meaningful contextual entity data ("50, Monday, CPU X, Program Z") is created. This data node identifier 516 is then sent to a query node 518, which is used to determine what the probability that an output of "50" from running Program Z on CPU X on a Monday is normal (e.g., there are no bugs in Program Z and CPU X is functioning without any faulty components). Stored within the evaluation node 520 is the value "40" (i.e., the "typical" value that is output by Program Z when running on CPU X on Mondays), against which the entity data "50" will be evaluated. Note that while 40 is often deemed as the normal (i.e., "expected") value to be generated by Program Z while running on CPU X on a Monday, an output value of "50" may actually be normal as well, depending on other programs that are interacting (e.g., calling) Program Z, whether the Monday from which the value "50" was generated is a holiday, etc. Thus, the query node 518 will send either the meaningful data ("50, Monday, CPU X, Program Z") or the data node identifier 516 to the evaluation node 520. Note that if the data node identifier 516 is sent, the evaluation node 520 can obtain the context from the context nodes 510 and 512 and the sub-context node 514.

The evaluation node 520 then sends the meaningful context-based entity data ("50, Monday, CPU X, Program Z") as well as the contextual baseline data ("40, Monday, CPU X, Program Z") to computation node 524, which determines the probability of "50, Monday, CPU X, Program Z" being abnormal (i.e., is indicative of a bug in Program Z, a faulty piece of hardware in CPU X, etc.). This probability (e.g., 95%) is then returned to the entity node 502 via the evaluation node 520 and the query node 518.

Figure 6:
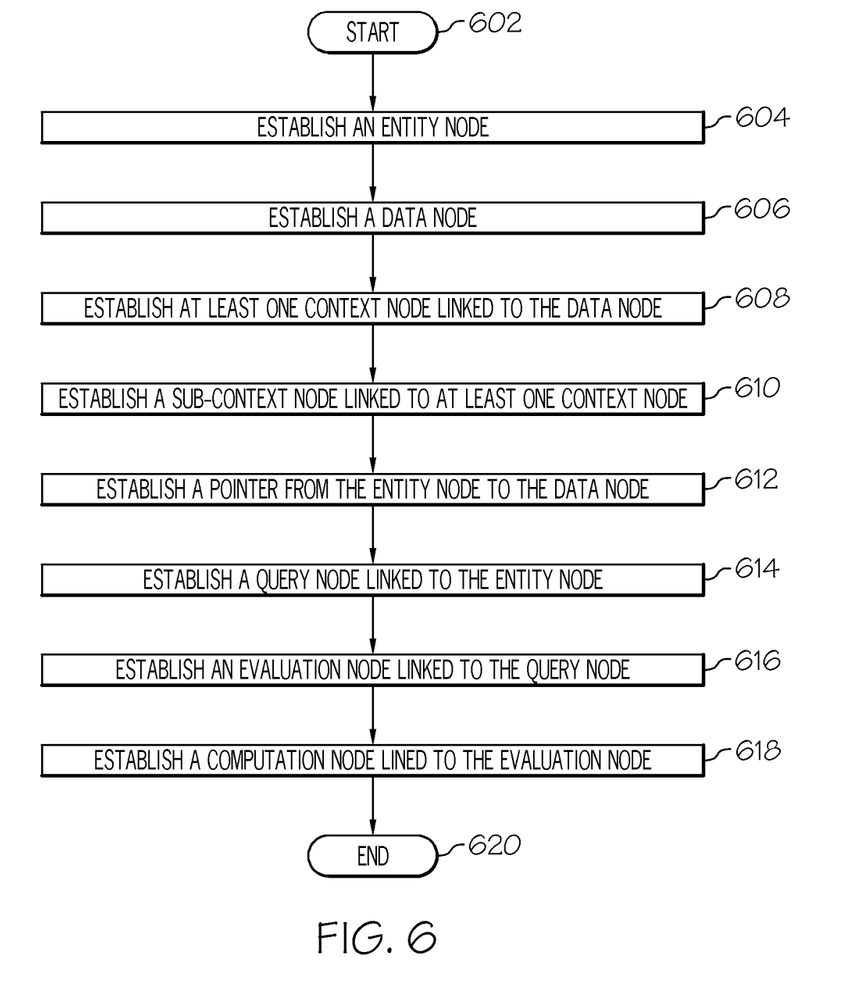
FIG. 6 is a high-level flow chart of one or more steps performed by a computer processor to create the context-based graphical database depicted in FIG. 2.

With reference now to FIG. 6, a high-level flow chart of one or more exemplary steps performed by a computer processor to create the context-based graphical database depicted in FIG. 2 is presented. After initiator block 602, an entity node is established (block 604). As described above, the entity node stores an identifier of an entity, which may be a person (e.g., a medical patient), a thing (e.g., an automobile), a system (e.g., an IT system), a process (e.g., software execution), a place (e.g., a city), etc. For example, a city may be linked to a data node having the value "50". Without context nodes telling the data node that this is a temperature in Fahrenheit in the middle of January, there would be no way of determining whether or not this value is normal, abnormal, valid, invalid, etc.

With reference to block 606, a data node is established. As described above, this data node stores non-contextual entity data (i.e., "meaningless data") about the entity, which has no context to identify what the meaningless data describes. As described in block 608, at least one context node is established and linked to the data node. This at least one context node provides context to the non-contextual entity data in the data node to create contextual entity data, which has context that identifies what the entity data describes. For example, the entity data may be "38", the context node(s) provide the context of ° C., human, oral, adult, in order to generate the meaningful contextual data of an adult human having an oral temperature of 38° C. As described in block 610, one or more of the context nodes may have a sub-context node, which provides additional granularity/clarity to the context provided by a context node to which the sub-context node is linked.

With reference to block 612, a pointer is established from the entity node to the data node. This pointer returns a data node identifier to the entity node, thus linking (i.e., associating) the contextual entity data to the entity.

As described in block 614, a query node is established and linked to the entity node. Note that in one embodiment, the query node receives the data node identifier from the entity node, thus enabling the query node to locate the contextual entity data. This contextual entity data may be stored in the data node (after the data node receives the contextual entity data from the context/sub-context nodes as described above), or the contextual entity data may be dynamically generated by the query node by applying context data from the context/sub-context nodes to the entity data that was originally stored in the data node. Thus, in one embodiment the query node receives the data node identifier from the entity node to 1) construct the contextual entity data or 2) to receive the contextual entity data that has been pre-constructed by and stored in the data node.

As described in block 616, an evaluation node is established and linked to the query node. In one embodiment, the evaluation node stores baseline data, which is linked to the context node(s) established in blocks 608 and 610 to create contextual baseline data. As described in block 618, an evaluation node is established and linked to the query node. The evaluation node stores baseline data, and is linked to at least one of the context node(s) and/or sub-context node(s) to create contextual baseline data.

As described in block 618, a computation node is established and linked to the evaluation node. The computation node compares the contextual entity data to the contextual baseline data in order to determine a probability of whether the contextual entity data is normal or abnormal. If the contextual entity data is abnormal, this indicates a malfunction/problem/error in the entity. As described above, in one embodiment the computation node utilizes a probability distribution of historical data to determine the probability of the contextual entity data being normal or abnormal.

In one embodiment, the entity is a medical patient. In this embodiment, the contextual entity data describes a medical condition (e.g., leukemia) of the medical patient. In this embodiment, the contextual entity data (e.g., lab results) are from a medical diagnostic device, such as an automated complete blood count (CBC) machine.

In one embodiment, the entity is a machine, such as an automobile, a piece of industrial machinery (e.g., a pump, a reactor, etc.), etc. In this embodiment, the contextual entity data is generated by a sensor on the machine, such as a thermometer, a gas detector, a vibration sensor, a radiation detector, etc.

In one embodiment, the entity is an information technology (IT) system, where the contextual entity data describes an output from a component of the IT system (e.g., from a piece of hardware or a unit of software). In this embodiment, the contextual entity data is received by the data node directly from the component of the IT system.

Figure 7:
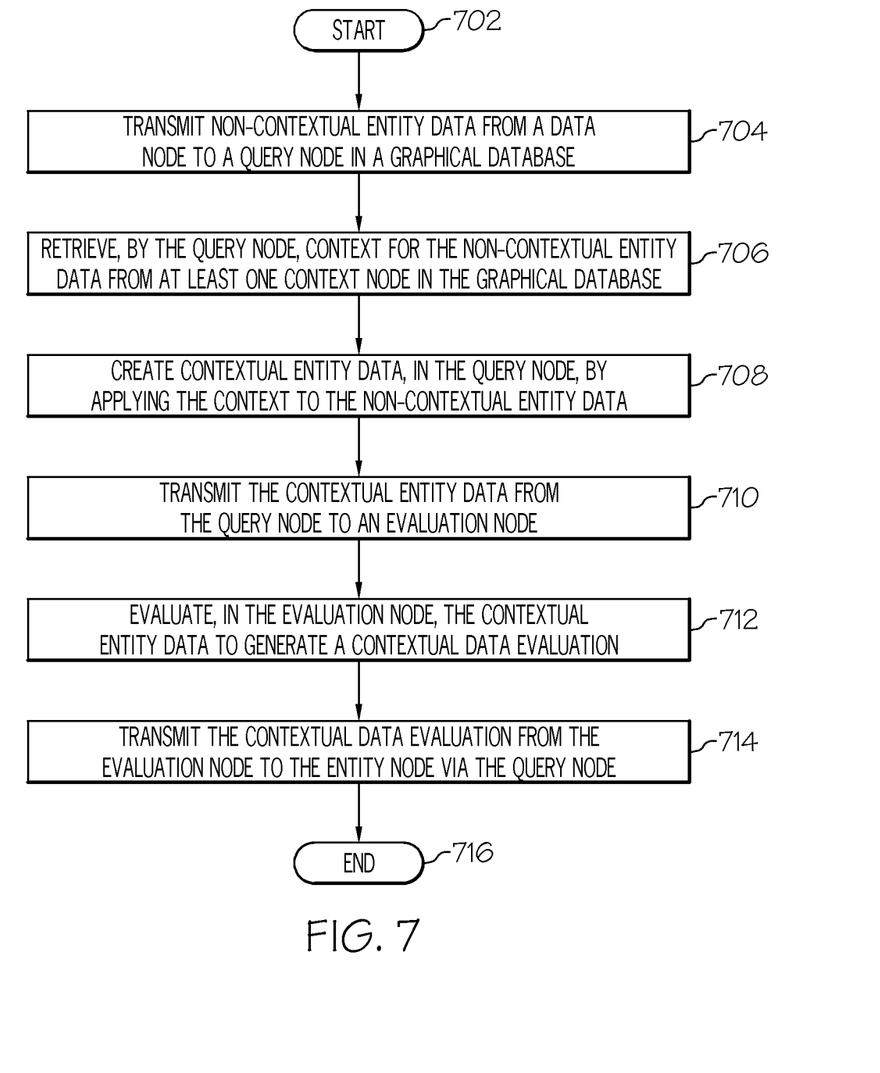
FIG. 7 is a high-level flow chart of one or more steps performed by a computer processor for utilizing the context-based graphical database depicted in FIG. 2.

With reference now to FIG. 7, a high-level flow chart of one or more steps performed by a computer processor for utilizing the context-based graphical database depicted in FIG. 2 is presented. After initiator block 702, non-contextual entity data is transmitted from a data node to a query node in a graphical database (block 704). As described above, this non-contextual entity data (i.e., "meaningless" data due to the lack of context for describing what the entity data means) may be sent from the data node to the query node via the entity node, or it may be sent directly from the data node to the query node if the query node has been provided with a pointer to the data node.

As described in block 706, the query node then retrieves context for the non-contextual entity data from at least one context node (and/or sub-context node) that is linked to the data node in the graphical database. This enables the query node to create/construct meaningful contextual entity data by applying the context from the context/sub-context node(s) to the original non-contextual entity data (block 708).

As described in block 710, this contextual entity data is then transmitted to a query node and/or an evaluation node, as described above. The query node and/or evaluation node are then able to generate a contextual data evaluation (block 712). This evaluation determines whether the contextual entity data is normal, abnormal, etc. within the context provided and according to past historical records/evaluations. The contextual data evaluation is then transmitted from the query/evaluation node(s) to the entity node (block 714). The process ends at terminator block 716.

As described above, the evaluation of current contextual entity data is made by comparing that current contextual entity data to past historical records/evaluations. In other embodiments, however, this comparison is performed by comparing the current contextual entity data to contextual data received from simulation programs, optimization programs, etc. For example, a simulation program may simulate the functions/activities of the type of entity being evaluated. This simulation program thus provides the datapoints needed to perform the evaluation described above.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product for creating a context-based graphical database system, the computer program product comprising:
   a non-transitory computer readable storage medium;
   first program instructions to establish an entity node, wherein the entity node stores an identifier of an entity;
   second program instructions to establish a data node, wherein the data node stores non-contextual entity data about the entity, wherein the non-contextual entity data is meaningless data, and wherein the meaningless data has no context to identify what the meaningless data describes;
   third program instructions to establish at least one context node linked to the data node, wherein said at least one context node provides context to the non-contextual entity data in the data node to create contextual entity data, and wherein the contextual entity data is meaningful data that contextually describes the entity;
   fourth program instructions to establish a pointer from the entity node to the data node, wherein the pointer returns a data node identifier to the entity node to correlate the contextual entity data to the entity;
   fifth program instructions to establish a query node linked to the entity node, wherein the query node receives the data node identifier from the entity node to locate the contextual entity data;
   sixth program instructions to establish an evaluation node linked to the query node, wherein the evaluation node stores baseline data, and wherein the evaluation node is linked to said at least one context node to create contextual baseline data; and
   seventh program instructions to establish a computation node linked to the evaluation node, wherein the computation node compares the contextual entity data to the contextual baseline data to determine a probability of the contextual entity data being abnormal, wherein the contextual entity data being abnormal indicates a malfunction in the entity; and wherein
   the first, second, third, fourth, fifth, sixth, and seventh program instructions are stored on the computer readable storage medium.

2. The computer program product of claim 1, further comprising:
   eighth program instructions to establish a sub-context node linked to said at least one context node, wherein the sub-context node provides additional context to the contextual entity data; and wherein
   the eighth program instructions are stored on the computer readable storage medium.

3. The computer program product of claim 1, wherein the entity is a medical patient, wherein the contextual entity data describes a medical condition of the medical patient, and wherein the contextual entity data is received at the data node from a medical diagnostic device.

4. The computer program product of claim 1, wherein the entity is a machine, wherein the contextual entity data describes a sensor output from the machine, and wherein the contextual entity data is received at the data node from a sensor on the machine.

5. The computer program product of claim 1, wherein the entity is an information technology (IT) system, wherein the contextual entity data describes an output from a component of the IT system, and wherein the contextual entity data is received at the data node directly from the component of the IT system.

6. A computer system comprising:
   a central processing unit (CPU), a computer readable memory, and a computer readable storage medium;
   first program instructions to establish an entity node, wherein the entity node stores an identifier of an entity;
   second program instructions to establish a data node, wherein the data node stores non-contextual entity data about the entity, wherein the non-contextual entity data is meaningless data, and wherein the meaningless data has no context to identify what the meaningless data describes;
   third program instructions to establish at least one context node linked to the data node, wherein said at least one context node provides context to the non-contextual entity data in the data node to create contextual entity data, and wherein the contextual entity data is meaningful data that contextually describes the entity;

fourth program instructions to establish a pointer from the entity node to the data node, wherein the pointer returns a data node identifier to the entity node to correlate the contextual entity data to the entity;

fifth program instructions to establish a query node linked to the entity node, wherein the query node receives the data node identifier from the entity node to locate the contextual entity data;

sixth program instructions to establish an evaluation node linked to the query node, wherein the evaluation node stores baseline data, and wherein the evaluation node is linked to said at least one context node to create contextual baseline data; and seventh program instructions to establish a computation node linked to the evaluation node, wherein the computation node compares the contextual entity data to the contextual baseline data to determine a probability of the contextual entity data being abnormal, wherein the contextual entity data being abnormal indicates a malfunction in the entity; and wherein the first, second, third, fourth, fifth, sixth, and seventh program instructions are stored on the computer readable storage medium for execution by the CPU via the computer readable memory.

7. The computer system of claim 6, wherein the computation node utilizes a probability distribution of historical data to determine the probability of the contextual entity data being abnormal.

8. The computer system of claim 6, wherein the computation node utilizes a probability distribution of simulation data, for an entity type of the entity, to determine the probability of the contextual entity data being abnormal.

9. The computer system of claim 6, further comprising:

eighth program instructions to establish a sub-context node linked to said at least one context node, wherein the sub-context node provides additional context to the contextual entity data; and wherein the eighth program instructions are stored on the computer readable storage medium for execution by the CPU via the computer readable memory.

10. The computer system of claim 6, wherein the entity is an information technology (IT) system, wherein the contextual entity data describes an output from a component of the IT system, and wherein the contextual entity data is received at the data node directly from the component of the IT system.

11. A processor-implemented method comprising:

establishing, by one or more processors, an entity node, wherein the entity node stores an identifier of an entity;

establishing, by one or more processors, a data node, wherein the data node stores non-contextual entity data about the entity, wherein the non-contextual entity data is meaningless data, and wherein the meaningless data has no context to identify what the meaningless data describes;

establishing, by one or more processors, at least one context node linked to the data node, wherein said at least one context node provides context to the non-contextual entity data in the data node to create contextual entity data, and wherein the contextual entity data is meaningful data that contextually describes the entity;

establishing, by one or more processors, a pointer from the entity node to the data node, wherein the pointer returns a data node identifier to the entity node to correlate the contextual entity data to the entity;

establishing, by one or more processors, a query node linked to the entity node, wherein the query node receives the data node identifier from the entity node to locate the contextual entity data;

establishing, by one or more processors, an evaluation node linked to the query node, wherein the evaluation node stores baseline data, and wherein the evaluation node is linked to said at least one context node to create contextual baseline data; and establishing, by one or more processors, a computation node linked to the evaluation node, wherein the computation node compares the contextual entity data to the contextual baseline data to determine a probability of the contextual entity data being abnormal, wherein the contextual entity data being abnormal indicates a malfunction in the entity.

\* \* \* \* \*